United States Patent
Coats et al.

[15] 3,674,984
[45] July 4, 1972

[54] VARIABLE SETPOINT PROPORTIONAL CONTROL APPARATUS FOR VACUUM BAKEOUT SYSTEMS

[72] Inventors: John C. Coats; George W. Wilson, III., both of Garland, Tex.

[73] Assignees: Republic National Bank of Dallas; Irving Trust Company; Union Bank

[22] Filed: May 14, 1970

[21] Appl. No.: 37,271

[52] U.S. Cl. .................................................... 219/496
[51] Int. Cl. ........................................................ H05b 1/02
[58] Field of Search ................... 219/496, 497, 332, 501; 165/31; 307/118

[56] References Cited

UNITED STATES PATENTS

| | | |
|---|---|---|
| 3,443,121 | 5/1969 | Weisbrod ............................ 219/497 |
| 3,365,654 | 1/1968 | Johnston ............................. 219/501 |
| 3,428,250 | 2/1969 | Holthausen ........................ 219/496 |
| 3,571,563 | 3/1971 | Shulz .................................. 219/496 |

Primary Examiner—Bernard A. Gilheany
Assistant Examiner—F. E. Bell
Attorney—Harvey G. Lowhurst

[57] ABSTRACT

An electronic heater control system for maintaining the vapor pressure within a vacuum bakeout system at an optimum level by causing the heating elements to be alternately energized and de-energized at a high frequency with the ON-OFF duty cycle being determined by the instantaneous vapor pressure in the system. The control circuitry includes a means for generating a time varying reference signal and a signal comparator means for comparing a pressure responsive signal to the reference signal. The comparator means then generates a heater control signal in response to the comparison for use in driving a heater energization switching means.

3 Claims, 4 Drawing Figures

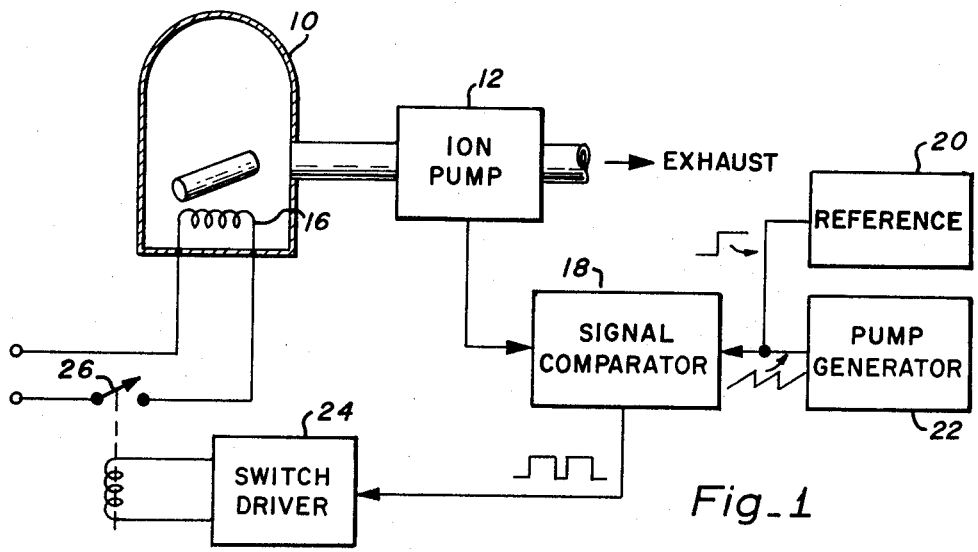
Fig_1
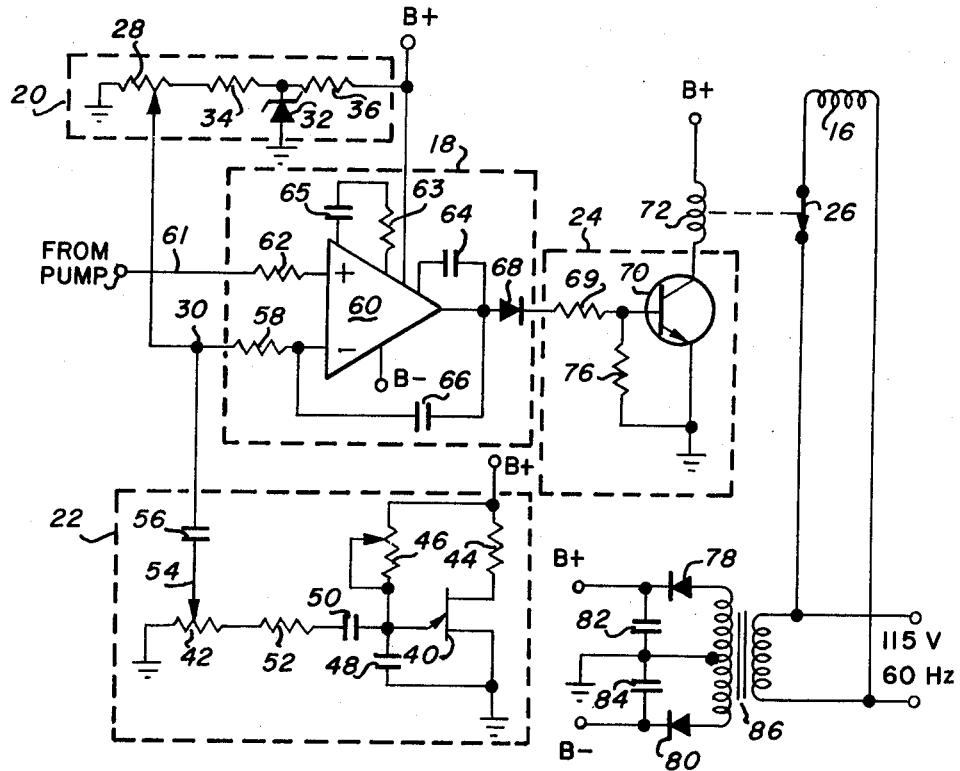
Fig_2
*INVENTOR.*
JOHN C. COATS
BY GEORGE W. WILSON
*ATTORNEY*

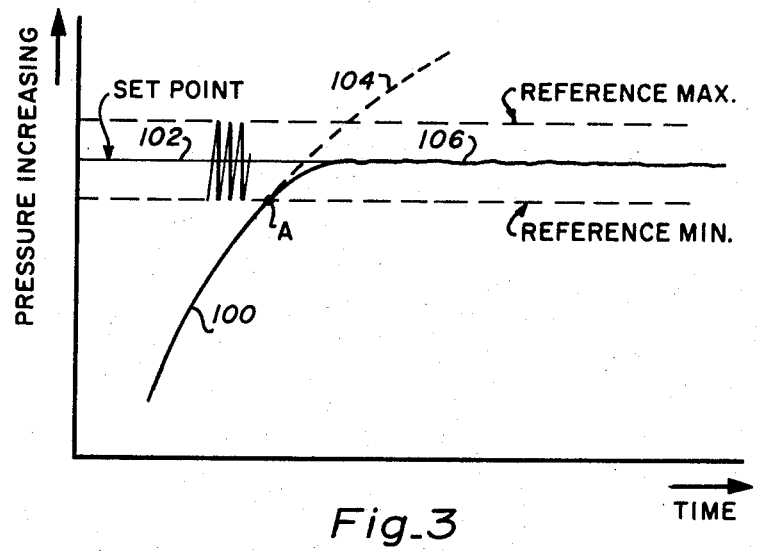
Fig_3
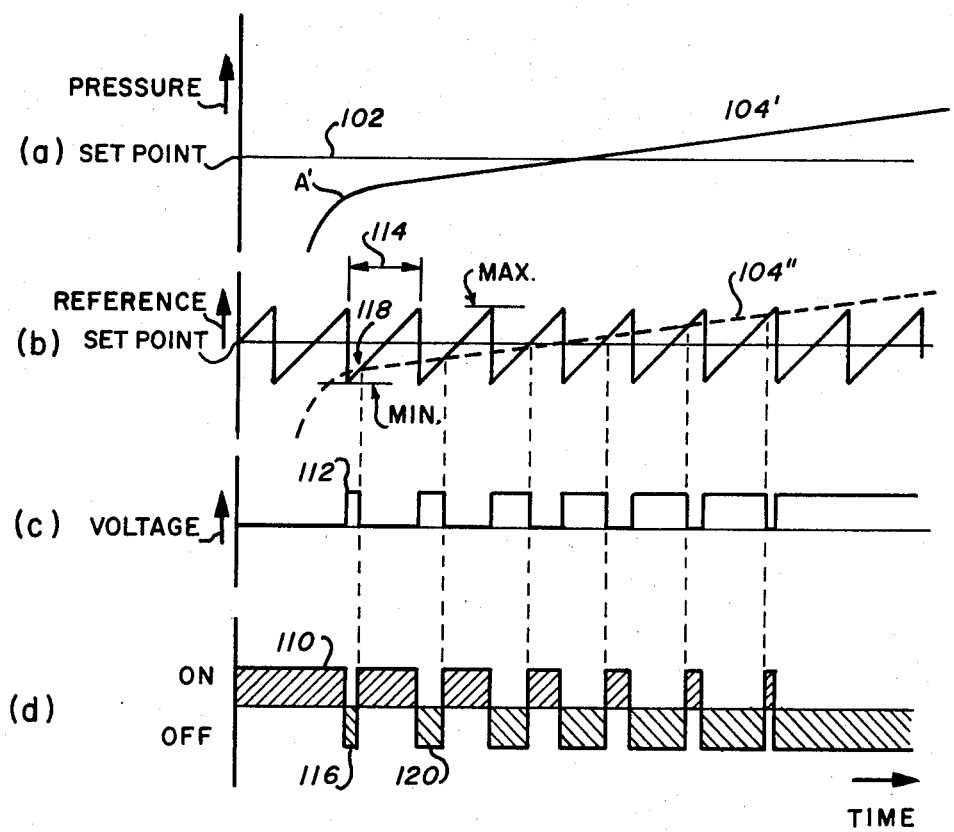
Fig_4

VARIABLE SETPOINT PROPORTIONAL CONTROL APPARATUS FOR VACUUM BAKEOUT SYSTEMS

BACKGROUND OF THE INVENTION

The present invention relates generally to gas evacuation control apparatus and, more particularly, to a variable setpoint proportional control apparatus for vacuum bakeout systems.

Vacuum bakeout systems for removing contaminants or other unwanted materials from objects such as vacuum tubes and the like typically include an evacuable chamber into which the specimen to be baked out is positioned, means for raising the temperature of the specimen, and means for evacuating the materials liberated from the specimen into the bakeout chamber. High vacuum devices of the type usually incorporated in these systems to evacuate from the bakeout chamber the vaporized materials liberated from the specimen have an efficiency which is critically dependent upon the vapor pressures to which the pump is subjected. For example, the pumping rate will be considerably greater when the vapor pressure is maintained at some optimum level than if it is allowed to fluctuate between extremes on either side of the optimum level. It is therefore desirable that means be provided to regulate the application of heat to the object being baked out so as to continuously liberate vapor into the chamber but at rates the pump can handle.

Heretofore, it was common practice to have an operator on hand to monitor the output of the ion pump and reduce the heat in step-wise fashion in an attempt to keep the pumping efficiency high. It takes a considerable period of time to bake out most structures and consequently, the only practical way to accomplish the regulation was to have the operator make periodic checks of the system to appropriately adjust the heat supply. However, since the rate at which materials are liberated depends upon many factors, and cannot be accurately predicted, this method invariably causes the operation to be highly inefficient.

Several attempts have been made in the past to provide an automated means for monitoring and controlling the heat supplied to the bakeout heaters. These attempts generally utilized crude control circuits which turned ON the heat until a predetermined pressure was sensed in the chamber whereupon the heat was turned OFF until the pressure dropped to a second predetermined pressure at which time the heat was turned ON again, etc. This method produces undesirable results because it causes the entire system to be alternately overworked and underworked due to the lag times of the system and the slowness of response of the control mechanism.

OBJECTS OF THE INVENTION

It is therefore a primary object of the present invention to provide a novel means for maintaining the vapor pressure in the bakeout system at an optimum level so as to enable the pumping mechanism to operate continuously at peak efficiency.

Another object of the present invention is to provide a novel vacuum bakeout control system wherein the heating mechanism used to vaporize the unwanted materials is controlled in response to the vapor pressure in the system.

Still another object of the present invention is to provide a novel vacuum bakeout control system wherein the heating mechanism for providing the bakeout operation is alternately energized at a high frequency with the ON-OFF duty cycle being determined by the instantaneous vapor pressure in the system.

SUMMARY OF THE INVENTION

In accordance with the present invention, an electronic heater control system is provided which maintains the vapor pressure at an optimum level by alternately energizing and de-energizing the heating elements at a high frequency with the ON-OFF duty cycle being determined by the instantaneous vapor pressure in the system as sensed by an ion gauge or determined by the ion current in the pump. In order that the heat applied to the specimen may be closely regulated so as to maintain constant pressure in the system, a signal comparison circuit is provided which compares the pressure responsive indicator to a reference which is caused to alternate between two limits.

A sawtooth variation is the preferred waveform for use in causing the reference signal to alternate between the two limits although other waveforms may also be used. By setting the mean value between the reference limits at the optimum operating pressure of the ion pump, the comparator will be caused to generate an alternating output signal having a duty cycle which is determined by the relationship between sensed vapor pressure and the reference signal. This signal is then used to drive switching means which alternately energizes and de-energizes the bakeout heater mechanisms so as to maintain the vaporization rate equal to the maximum pumping rate of the pump.

One advantage of this system over prior art systems is that the vapor pressure in the system is continuously monitored and only enough heat is supplied to the system to maintain the pressure at a predetermined level. This means that if at some temperature a large amount of gas tends to be liberated, the heater temperature will be closely regulated so that the rate at which the gases are boiled off is consistent with the optimum pumping capability of the ion pump.

Another advantage of the present invention is that the bakeout heater is operated at full capacity until a temperature is reached at which substantial quantities of gases tend to be liberated and is then regulated in accordance with the rate at which the gases are liberated as determined by the vapor pressure in the system. As a result, the temperature rise in the specimen being baked out will not necessarily be linear, but will be dependent upon the liberation rate of the materials being disposed of.

These and other advantages of the present invention will become apparent to those skilled in the art after having read the following detailed description of a preferred embodiment.

In the drawing:

FIG. 1 is a block diagram showing the operative components of a system in accordance with the present invention.

FIG. 2 is a detailed schematic showing an electronic heater control system in accordance with the present invention.

FIG. 3 is a vapor pressure versus time diagram illustrating the operation of the present invention.

FIG. 4 is a timing diagram illustrating the manner of operation of the control system of the present invention.

DETAILED DESCRIPTION OF A PREFERRED EMBODIMENT

Referring now to FIG. 1 of the drawing, there is shown a vacuum bakeout system including an evacuable chamber 10 which is coupled to an ion pump 12 for evacuating the chamber to an extremely low pressure. It is to be understood, of course, that other forepumping apparatus, not shown, may be provided to initially reduce the pressure in the chamber 10 to the operating level of the pump 12. In order to vaporize unwanted materials and thus liberate them from a specimen 14 positioned within the chamber 10, a heating element 16 is provided within the chamber for raising the temperature of the specimen. Since the pump 12 operates most efficiently when the vapor pressure within the chamber 10 is maintained at some predetermined level, and since different material will be vaporized at different temperatures and at different rates, an electronic means is provided in accordance with the present invention for controlling the energization of the heater 16 so as to control the rate of vaporization and thus the pressure within the chamber at the optimum pumping pressure.

The novel control mechanism includes a signal comparator 18 which compares the ion current of the pump 12, or the output of an ion gauge, these being proportional to the pressure within the chamber 10, to a reference signal provided by the reference 20. A ramp generator 22 or other alternating signal source is provided for modulating the reference signal with a sawtooth voltage which adds to and subtracts from the reference signal such that the reference signal alternately varies linearly between a value less than and a value greater than the reference signal voltage. Thus, where the comparator 18 is of the type which provides an output only when an unknown input signal is equal to or exceeds the reference input, it will be noted that an output will be obtained during each cycle that the unknown exceeds the lower reference valve, and that the duration of the signal will depend upon the relationship between the unknown and the lower reference valve.

This operation will be explained in more detail below with reference to FIG. 4, but for now suffice it to say that no output will be generated by comparator 18 until the input from the pump reaches a first reference level, but upon reaching this level an output signal will be periodically generated at the frequency of the generator 22, and the duration of the output during each cycle, i.e., the duty cycle of the output signal, will depend upon the magnitude of the unknown input signal. In effect then, the duty cycle of output of signal comparator 18 will be varied in accordance with the relationship of the actual pressure within the chamber 10 to the optimum pressure as indicated by the reference 20.

The output of the signal comparator is fed into a switch driver 24 which drives the switch 26 so as to cause the heater 16 to be de-energized during the time that an output is obtained from comparator 18, thus reducing the heat supplied to specimen 14 in accordance with the vapor pressure in the chamber 10.

Turning now to FIG. 2, a simplified schematic of a preferred embodiment of the electronic heater control system is illustrated. It will be noted that like numerals in FIGS. 1 and 2 designate common components. The reference 20 (setpoint reference) includes a potentiometer 28 whose wiper can be set at a desired position so as to provide a reference potential at the circuit point 30. The current supplied to the potentiometer 28 is maintained constant by a zener diode 32 which serves as a voltage regulator for the reference. Current limiting and dropping resistors 34 and 36 are also provided so as to enable an available B+ voltage to be used as a supply for the reference 20.

The ramp generator 22, which may also be referred to as a proportional band circuit, includes a unijunction transistor (UJT) 40 which is biased to act as a relaxation oscillator for generating a sawtooth signal across the potentiometer 42. The frequency of oscillation of the generator 22 can be varied by the cycle rate control potentiometer 46. Capacitor 50 provides DC isolation for the proportional band control potentiometer 42 to prevent loading of the oscillator. The sawtooth output obtained at the wiper 54 of potentiometer 42 is applied to the inverting input 30 through a capacitor 56 which provides isolation so that it will not be coupled in parallel with the setpoint control so as to interfere therewith.

The sawtooth modulated reference signal thus made available at node 30 is fed through a resistor 58 to one input of the comparator 18, i.e., the negative input of an operational amplifier 60 wherein it is compared to an unknown DC voltage applied to terminal 61. The input at terminal 61 is obtained from the recorder output of an ion gauge or the recorder output of the supply for ion pump 12. The unknown voltage at the non-inverting input 61 is fed through a resistor 62 to the amplifier 60. When the input voltage at the non-inverting input 61 is greater than the setpoint voltage at the input 30, amplifier 60 will have a positive output. Conversely, when the input voltage at 61 is less than the setpoint voltage, the output of amplifier 61 will be negative. The resistor 63 and capacitors 64 and 65 provide frequency compensation and are used only as required for the particular operational amplifier used. Capacitor 66 provides degenerative feedback to attenuate gain of AC signals while allowing maximum DC gain.

The output of amplifier 60 is fed through a diode 68 which effectively blocks the negative output components so that only the positive components are fed into switch driver 24. These signals are passed through a resistance 69 and into the base of an npn transistor 70 which becomes conductive in response to a positive output voltage received from amplifier 60, and allows current to flow through solenoid 72 to actuate the heater control switch 26, de-energizing heater 16. When the output of amplifier 60 subsequently goes negative, no current is allowed to flow through diode 68, thus no base bias is provided to transistor 70 and it becomes nonconductive allowing switch 26 to close and energize heater 16. The diode 68 is inserted in the output circuit of amplifier 60 to prevent large negative bias signals and possible damage to the emitter junction of transistor 70. However, when the output of amplifier 60 is positive, current will flow through diode 68 to provide proper bias to transistor 70 causing it to turn rapidly on. A biasing resistor 76 is connected between the base and emitter of the transistor 70.

The B+ and B− potentials required for the previously described circuit may be obtained from a rectifier comprised of a pair of diodes 78 and 80 and a pair of capacitors 82 and 84. The rectifier is energized through a transformer 86 by a 115 volt 60 hertz line current.

A preferred form of the above described circuit includes the following components and elemental values:

| | |
|---|---|
| potentiometer 28 | 15 K-ohm |
| zener diode 32 | Type IN4740 |
| resistor 34 | 150 K-ohm |
| resistor 36 | 1 K-ohm |
| UJT 40 | Type 2N2646 |
| potentiometer 42 | 0.5 meg-ohm |
| resistor 44 | 470 ohms |
| resistor 46 | 0.5 meg-ohm |
| capacitor 48 | 200 $\mu$-farad |
| capacitor 50 | 22 $\mu$-farad |
| resistor 52 | 1.5 meg-ohm |
| capacitor 56 | 22 $\mu$-farad |
| resistor 58 | 22 K-ohm |
| operational amplifier 60 | Type $\mu$A709 |
| resistor 62 | 22 K-ohm |
| resistor 63 | 1 K-ohm |
| capacitor 64 | 22 p-farad |
| capacitor 65 | 300 p-farad |
| capacitor 66 | 1000 p-farad |
| diode 68 | Type IN2071 |
| transistor 70 | Type 2N697 |
| solenoid 72 | Chemtron 550–12–2A |
| resistor 76 | 68 K-ohm |
| diode 78 | IN2071 |
| diode 80 | IN2071 |
| capacitor 82 | 100 $\mu$-farad |
| capacitor 84 | 100 $\mu$-farad |
| transformer 86 | 110/24 C.T. 400 m.a. |

In operation, the chamber 10 is evacuated to some predetermined low pressure prior to actuation of the bakeout heater 16. The heater 16 and electronic control circuit are then actuated with the heater 16 being turned full ON so as to supply maximum heat to the specimen 14. As the temperature in the specimen 14 begins to rise, vaporizable contaminants will be driven off and will cause the vapor pressure in chamber 10 to begin to rise. This rise in pressure will be indicated by a rise in the output of an ion gauge or the recorder output of the pump 12, and may resemble the portion of the curve indicated at 100 in FIG. 3.

Since the vapor pressure initially will be substantially lower than the optimum operational level for the pump 12 (indicated in FIG. 3 by line 102), the duty cycle of the output signal of amplifier 60 will be 0 percent (recalling that only positive outputs actuate switch driver 24) causing the heater 16 to be maintained ON continuously. However, as the pressure increases to some point A which corresponds to the lower limit of the modulated reference signal, i.e., the reference minimum, the operational amplifier 60 will start to provide positive output signals whose duty cycle increases above 0 percent, thus activating driver 24 which causes heater 16 to be intermittently de-energized until the pressure within the system becomes stabilized at the optimum or setpoint pressure of the system as shown at 106. Thus, instead of the pressure rise continuing to increase above the setpoint 102 as indicated by the broken line 104, and as it would tend to do if there were no heat control, the pressure will level out with only minor undulations about the setpoint level 102 as shown at 106 and FIG. 3.

In FIG. 4, the actual mechanics of operation of the control system are illustrated. Part (a) is a pressure diagram showing a linear rise in pressure through the setpoint level 102. Point A' corresponds to point A of FIG. 3, and line 104' is an uncorrected linear increase in pressure corresponding to the line 104 of FIG. 3. Note, however, that the time scale of FIG. 4 is expanded considerably with respect to that shown in FIG. 3.

In part (b) of FIG. 4, the sawtooth modulated reference, which is applied to the negative input of the comparator 18, is illustrated with the pressure variation line superimposed at 104''.

Part (c) illustrates the form of the output signals from comparator 18 for the various pressure levels indicated in parts (a) and (b).

Part (d) illustrates the ON-OFF conditions of the heater 16 in response to the various input signals shown in part (c) and generated by comparator 18 pursuant to the pressure levels shown in parts (a) and (b).

Returning now to the operational discussion, the potentiometer 28 is set so that the voltage obtained therefrom is proportional to the optimum vapor pressure for the system (the setpoint level), and wiper 54 of the proportional band potentiometer 42 is set to provide the desired ramp signal amplitude, thus setting the reference minimum and maximum levels. Heater 16, after being turned ON will remain full ON, as shown at 110 in part (d) of FIG. 4, until the vapor pressure in the system reaches the reference minimum at point A (FIG. 3). However, when the pressure rises above the point A, a positive output 112 (FIG. 4(c)) will be generated by comparator 18 which lasts during the portion of reference cycle 114 (FIG. (b)) wherein the reference signal is less than the pressure signal. This output will be fed to the switch driver 24 which opens the switch 26 to de-energize the heater 16 during that portion of the reference cycle as indicated at 116 (FIG. 4(d)).

As the reference signal rises above the actual pressure signal, as shown at 118 (FIG. 4(b)), the output of amplifier 60 terminates and driver 24 is de-energized allowing switch 26 to close and turn the heater back ON for the remainder of cycle 114. Similarly, amplifier 60 will generate another output signal 120 as the reference drops below the measured pressure at the end of cycle 114. As the actual pressure continues to rise to the setpoint, the proportion of each cycle during which the heater is de-energized will increase until the pressure is stabilized at the setpoint level.

Should the pressure continue to rise beyond the setpoint, the time during each cycle wherein the heater is de-energized will continue to increase until such time that the pressure exceeds the maximum value of the reference signal at which time the heater will remain OFF continuously until vapor pressure drops back into the control region below the reference max. But, since the frequency of the reference signal is relatively high, typically on the order of about 30 cycles per minute, the pressure will generally be stabilized before it is allowed to rise above the control range.

It will readily be understood by those skilled in the art that the present invention, in providing continuous instantaneous inspection of the vapor pressure in the system and corresponding control of the heat supplied to the source of vapor so as to maintain the vapor pressure at the optimum level for the pump 22, enables maximum efficiency to be obtained from the pumping system. As a result, the time required to bakeout a given specimen is reduced substantially below that required to perform a similar bakeout operation using prior art methods.

After having read the foregoing disclosure, it is contemplated that many alterations and modifications of the invention will undoubtedly become apparent to those skilled in the art. It is therefore to be understood that this disclosure is by way of illustration only and is in no way intended to be limiting to the particular embodiment disclosed. Accordingly, I intend that the appended claims be interpreted as covering all such modifications which fall within the true spirit and scope of the invention.

What is claimed is:

1. A vacuum bakeout system for outgassing an object while said object is being heated comprising
   an ion vacuum pump means for pumping the vapor emission from said heated object,
   said ion pump means producing an output signal dependent on the vapor pressure of said pump,
   a heater for applying said heat to said object,
   and means for controlling said heater to thereby regulate the heat applied to said object and thus control the vapor emission thereof comprising
   reference means for providing a selectable reference signal whose amplitude varies cyclically with time between two predetermined limits;
   comparator means for comparing said output signal related to the vapor pressure to said reference signal and providing a cyclical control signal responsive to a predetermined relationship therebetween, said comparator comprising an operational amplifier means having one input responsive to said vapor pressure signal and another input responsive to said reference signal such that the output provided by said comparator means is comprised of a chain of periodically occurring pulses having a period determined by said reference signal and a duty cycle determined by said predetermined relationship between said pressure signal and said reference signal; and
   heater control means responsive to said cyclical control signal for alternately energizing and deenergizing said heater means at a predetermined frequency.

2. A vacuum bakeout system as claimed in claim 1 wherein said reference means includes a ramp generator means for producing said cyclical reference signal with a sawtooth configuration.

3. A vacuum bakeout system as claimed in claim 1 including means for adjusting said reference signal to thereby adjust said predetermined relationship between the pressure signal and the reference signal to set said duty cycle.

* * * * *

PO-1050
(5/69)

UNITED STATES PATENT OFFICE
CERTIFICATE OF CORRECTION

Patent No. 3,674,984          Dated July 4, 1972

Inventor(s) John C. Coats and George W. Wilson, III

It is certified that error appears in the above-identified patent and that said Letters Patent are hereby corrected as shown below:

In the drawings, sheet 1, Fig. 1, the legion in box 22 should be changed from "Pump Generator" to "Ramp Generator". In Fig. 2 the polarity of diode 80 should be reversed such that the diode symbol is as follows:

In the unijunction transistor 40 the arrow for the input terminal should be pointing as follows:

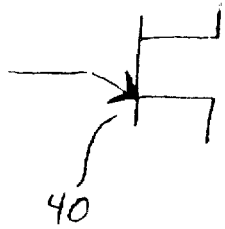

Signed and sealed this 9th day of January 1973.

(SEAL)
Attest:

EDWARD M. FLETCHER, JR.
Attesting Officer

ROBERT GOTTSCHALK
Commissioner of Patents